United States Patent [19]

Stirling

[11] 4,342,399

[45] Aug. 3, 1982

[54] COMPOSITE BOTTLE

[75] Inventor: Robert F. Stirling, St. Louis County, Mo.

[73] Assignee: The Seven-Up Company, St. Louis, Mo.

[21] Appl. No.: 234,721

[22] Filed: Feb. 17, 1981

[51] Int. Cl.³ .............................................. B65D 23/08
[52] U.S. Cl. .................................... 215/12 R; 220/450
[58] Field of Search ...................... 215/12 R; 220/450; 229/3.5 MF

[56] References Cited

U.S. PATENT DOCUMENTS

| | | | |
|---|---|---|---|
| 2,849,144 | 8/1958 | Southwell | 220/4 |
| 3,298,559 | 1/1967 | Lurie | 220/450 |
| 3,325,030 | 6/1967 | Rausing et al. | 215/12 R |
| 3,480,168 | 11/1969 | Lee | 215/1 C |
| 3,799,423 | 3/1974 | Cvacho | 220/450 |
| 3,948,404 | 4/1976 | Collins et al. | 215/12 R X |
| 4,281,769 | 8/1981 | Ignell | 215/12 R |

Primary Examiner—Donald F. Norton
Attorney, Agent, or Firm—Senniger, Powers, Leavitt and Roedel

[57] ABSTRACT

A composite bottle for carbonated beverages comprising a bottle of $CO_2$-permeable synthetic resin having a cylindrical body, and a tubular $CO_2$-impermeable jacket covering at least a substantial portion of the body for reducing loss of beverage carbonation by $CO_2$ permeation through the bottle.

13 Claims, 3 Drawing Figures

COMPOSITE BOTTLE

BACKGROUND OF THE INVENTION

This invention relates to beverage bottles and, more particularly, to nonreturnable plastic beverage bottles for carbonated beverages.

Because glass bottles are relatively heavy and breakable, the use of plastic bottles for carbonated beverages (e.g., soda) has become widespread. However, plastic bottles are not without drawback, since synthetic resins practicable for use in making beverage bottles are $CO_2$-permeable. Thus, carbonated beverages in plastic bottles tend to lose their carbonation over a relatively short period of time (8–10 weeks), especially where the bottles are relatively small in size (e.g., one-half liter) and have correspondingly large surface area to volume ratios.

U.S. Pat. Nos. 3,480,168, 3,325,030, and 2,849,144 disclose plastic bottles of various types.

SUMMARY OF THE INVENTION

Among the several objects of this invention may be noted the provision of a plastic carbonated beverage bottle provided with means for reducing permeation of $CO_2$ through the bottle to increase the shelf life of the contents of the bottle; and the provision of such a bottle which is attractive in appearance and relatively inexpensive to manufacture.

Generally, a carbonated beverage bottle of the present invention comprises a bottle of $CO_2$-permeable synthetic resin having a cylindrical body, and a tubular $CO_2$-impermeable jacket covering at least a substantial portion of the body for reducing loss of carbonation by $CO_2$-permeation through the bottle. The jacket comprises an outer layer capable of having decorative labeling matter printed thereon, an intermediate layer of fibrous material bonded to the outer layer, and an inner layer of $CO_2$-impermeable material adhered to the intermediate layer and to the body of the bottle for holding the jacket in place on the body.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
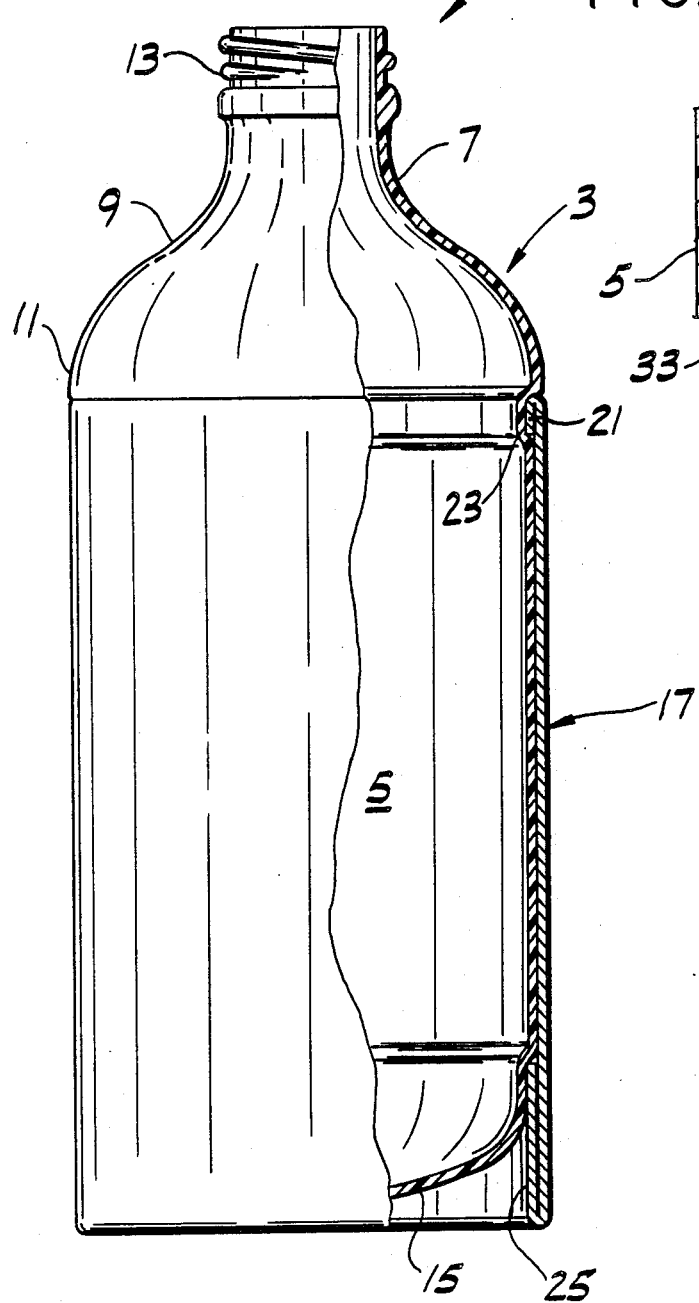
FIG. 1 is an elevation of a composite bottle of the present invention with parts broken away to illustrate details.

Referring first to FIG. 1, there is generally indicated at 1 a composite bottle for carbonated beverages comprising a plastic bottle 3 (e.g., a one-half liter bottle) having a cylindrical body 5 and a neck 7 with a transition 9 convergent from a peripheral shoulder 11 at the upper end of the body to the neck. The neck has the usual finish 13, herein shown as a screwed-thread finish for a screw cap (not shown). The bottom 15 of the bottle is rounded. The bottle is preferably formed (blow molded) from polyethylene terephthalate (PET), a synthetic resin which is $CO_2$-permeable. Other resins may also be suitable, such as acrylonitrile which is also $CO_2$-permeable.

At 17 is indicated a jacket, generally tubular in shape, covering substantially the entire body of the bottle below the shoulder 11. In accordance with this invention, jacket 17 is $CO_2$-impermeable for reducing the loss of beverage carbonation by permeation of carbon dioxide through the body of the bottle. The tubular jacket extends down below the bottom of the bottle and serves as a stand for stably supporting the bottle. As will appear in more detail hereinbelow, the jacket is adhered to the bottle. To avoid the exposure of raw edges, the upper margins of the jacket are doubled down on the inside of the jacket, as indicated at 21, and received in a circumferential groove 23 in the body of the bottle adjacent its upper end immediately below shoulder 11. Similarly, the lower margins of the jacket are doubled up on the inside of the jacket, as indicated at 25. Since the jacket serves not only as a $CO_2$ barrier but also as a stand, the double thickness of the jacket wall at this point is advantageous.

Figure 2:
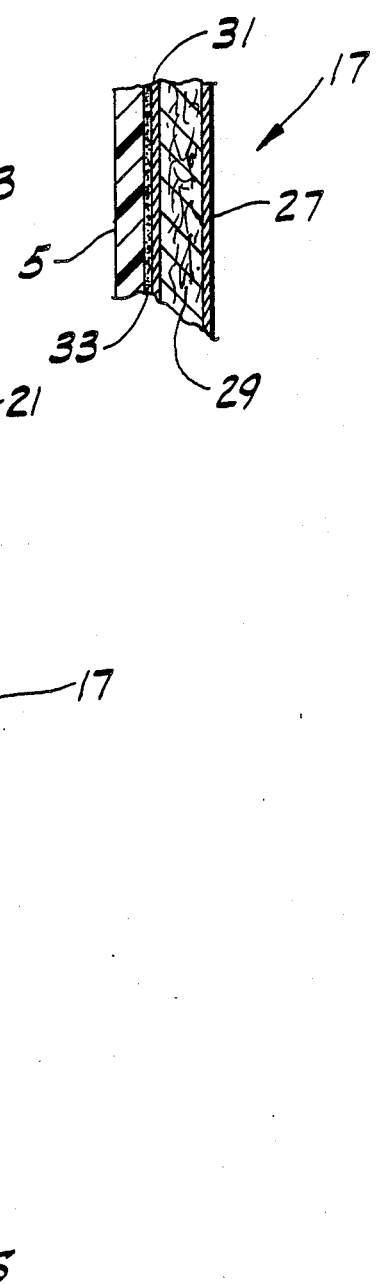
FIG. 2 is an enlarged view of a portion of FIG. 1 showing the wall construction of the composite bottle.

As best shown in FIG. 2, jacket 17 is of laminated construction, comprising an outer layer 27 of a material (e.g., polyester) capable of having decorative labeling matter printed thereon, an intermediate layer 29 of fibrous material (e.g., paperboard) bonded by suitable adhesive to the outer layer, and an inner layer 31 of $CO_2$-impermeable material adhered to the intermediate layer 29 and to the body 5 of the bottle for holding the jacket 17 in place on the bottle. This inner layer 31 is preferably aluminum foil having a caliper of about 0.0003 in. (approximately ⅓ mil.), but other materials impermeable to $CO_2$ may also be suitable. It will be understood that the thickness of the bottle wall and the various layers of the jacket are distorted in FIG. 2 for purposes of illustration. By way of example only, the outer (label) layer 27 may be 1 mil. thick, the fibrous layer 29, 15 mils. thick, and the foil about ⅓ mil. thick. The bottle wall may be 10 mils. thick, for example. The fibrous intermediate layer 29 is relatively thick to provide the necessary body and support for the inner and outer layers.

The adhesive used to bond the fibrous layer 29 to the inner and outer layers 31 and 27 may be of any conventional type. The adhesive used in bonding the foil layer 31 to the body 5 of the bottle, indicated at 33 in FIG. 2, should be impermeable to the passage of carbon dioxide and should be of a type (e.g., heat-activated or pressure-sensitive) which enables the bottle to be molded and the jacket to be applied in one operation, as described below.

Figure 3:
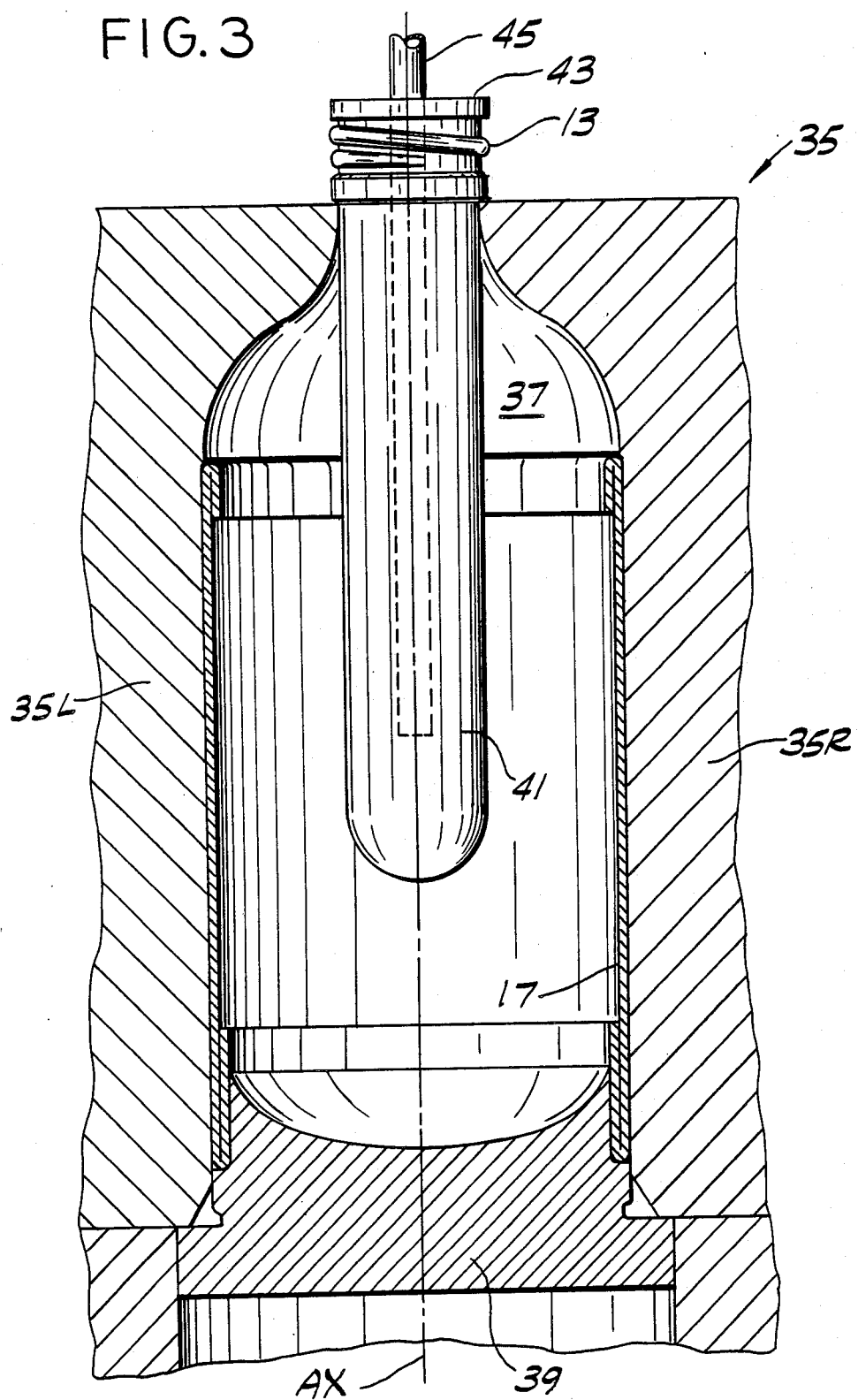
FIG. 3 is a view illustrating a molding step in the method of making the bottle.

FIG. 3 illustrates blow-molding apparatus for making the composite bottle 1, but it will be understood that other apparatus could also be used. The apparatus shown comprises a mold 35 having left and right halves 35L, 35R defining a mold cavity 37 conforming to the shape of a finished bottle. The bottom of this cavity 37 is closed by an end piece 39 contoured to form the bottom of the bottle and movable vertically along the central vertical axis AX of the mold cavity. The top of end piece 39 is formed for telescopically receiving thereon the lower end of a preformed jacket 17. A parison 41 of a moldable synthetic resin (e.g., PET) preformed to have a screw-thread bottle finish 13 at its upper end is supported within the mold cavity. The upper end of the tubular parison is closed by a seal 43 having a blowpin 45 extending downwardly therethrough into the parison to permit air to be blown into the latter.

In the molding process, the mold halves 35L and 35R are initially separate and the parison 41 is suspended by conventional means in vertical position along axis AX. End piece 39 mounting a preformed jacket 17 is then raised to its FIG. 3 position, either the jacket or the parison 41 being precoated with adhesive 33. The mold halves are thereafter brought together. That portion of the parison below the finish 13 is heated (e.g., to 200° F.) and assumes a molten state. Air is blown through blowpin 45 into the parison, causing the heated parison to expand outwardly against the side walls of the mold halves 35R, 35L (which are chilled) and against the inside of jacket 17 to form bottle 3. The mold halves are then separated, the jacket being securely adhered to the bottle by adhesive 33.

While the jacket 17 described above serves as a stand for the bottle as well as a $CO_2$ barrier, it will be understood that this need not be the case. The bottle could be provided with a different means of support, such as a base cup or foot integrally molded with the bottle. In such case, however, the jacket 17 should still cover substantially the entire body from immediately below shoulder 11 down to the lower end or heel of the body to maximize the bottle surface area covered by the jacket and thus minimize the loss of $CO_2$ by permeation through the bottle. There will of course still be some $CO_2$ permeation through the unjacketed portions of the bottle. However, the jacket 17 reduces considerably the overall rate of carbonation loss, thereby substantially increasing the shelf life of the carbonated beverage within the bottle (from 10–14 weeks, for example, in the case of the one-half liter bottle).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A composite bottle for carbonated beverages comprising a bottle of a $CO_2$-permeable synthetic resin having a cylindrical body, and a tubular $CO_2$-impermeable jacket covering at least a substantial portion of the body for reducing loss of carbonation by $CO_2$ permeation through the bottle, said jacket comprising an outer layer capable of having decorative labeling matter printed thereon, an intermediate layer of fibrous material bonded to the outer layer, and an inner layer of $CO_2$-impermeable material adhered to the intermediate layer and to the body of the bottle for holding the jacket in place on the body.

2. A composite bottle as set forth in claim 1 wherein said outer layer is of polyester.

3. A composite bottle as set forth in claim 1 wherein said $CO_2$-impermeable layer is metal foil.

4. A composite bottle as set forth in claim 3 wherein said metal foil is aluminum foil.

5. A composite bottle as set forth in claim 4 wherein said foil is approximately 0.0003 in. thick.

6. A composite bottle as set forth in claim 1 wherein said synthetic resin material is polyethylene terephthalate.

7. A composite bottle as set forth in claim 1 wherein said $CO_2$-impermeable layer is adhered to the bottle.

8. A composite bottle as set forth in claim 1 wherein said bottle has a neck with a transition convergent from a shoulder at the upper end of the body to the neck, said jacket covering the bottle from immediately below the shoulder to the bottom of the body.

9. A composite bottle as set forth in claim 1 wherein the bottom of said bottle is rounded and said jacket extends down beyond the bottom of the bottle for stably supporting the bottle.

10. A composite bottle as set forth in claim 9 wherein the lower margins of the tubular jacket are doubled up on the inside of the jacket.

11. A composite bottle as set forth in claim 1 wherein the body of the bottle is formed with a circumferential groove therein adjacent its upper end, the upper margins of the tubular jacket being doubled down on the inside of the jacket and received in said groove.

12. A composite bottle as set forth in claim 1 wherein said bottle has a rounded bottom and a neck with a transition convergent from a shoulder at the upper end of the body to the neck, said jacket covering substantially the entire body of the bottle below the shoulder and extending down below the bottom of the bottle for stably supporting the bottle.

13. A composite bottle for carbonated beverages comprising a bottle of a $CO_2$-permeable synthetic resin material having a cylindrical body, a rounded bottom, and a neck with a transition convergent from a peripheral shoulder at the upper end of the body to the neck, the latter having a screw-thread finish for a screw cap, a tubular $CO_2$-impermeable jacket covering substantially the entire body of the bottle below the peripheral shoulder and extending down below the bottom of the bottle for stably supporting the latter, said jacket comprising an outer layer capable of having decorative labeling matter printed thereon, an intermediate layer of fibrous material bonded to the outer layer, and an inner layer of aluminum foil adhered to the intermediate layer and the body of the bottle, said layer of aluminum foil providing a $CO_2$-impermeable barrier for reducing loss of carbonation by $CO_2$ permeation through the bottle.

* * * * *